United States Patent [19]

Puydak et al.

[11] Patent Number: 5,051,478

[45] Date of Patent: Sep. 24, 1991

[54] ETHYLENE COPOLYMER - MODIFIED DYNAMICALLY VULCANIZED ALLOYS

[75] Inventors: Robert C. Puydak, Cranbury; Donald R. Hazelton, Chatham, both of N.J.

[73] Assignee: Advanced Elastomer Systems, L. P., St. Louis, Mo.

[21] Appl. No.: 558,695

[22] Filed: Jul. 26, 1990

[51] Int. Cl.$^5$ .................. C08L 9/00; C08L 15/02; C08L 23/26; C08L 33/04

[52] U.S. Cl. .................. 525/195; 525/93; 525/125; 525/133; 525/192; 525/194; 525/196; 525/197; 525/198; 525/221; 525/222; 525/227; 525/221; 524/523; 524/524

[58] Field of Search ............... 525/222, 195, 196, 197, 525/194, 221, 227

[56] References Cited

U.S. PATENT DOCUMENTS

| | | | |
|---|---|---|---|
| 2,369,471 | 2/1945 | Latham | 260/4 |
| 3,037,954 | 6/1962 | Gessler et al. | 260/29.8 |
| 3,081,279 | 3/1963 | Hammel et al. | 260/45.5 |
| 3,326,833 | 6/1967 | Raley | 260/28.5 |
| 3,758,643 | 9/1973 | Fischer | 260/897 A |
| 3,806,558 | 4/1974 | Fischer | 260/897 A |
| 4,104,210 | 8/1978 | Coran et al. | 260/4 R |
| 4,130,534 | 12/1978 | Coran et al. | 260/33.6 AQ |
| 4,210,579 | 7/1980 | Grigo et al. | 525/88 |
| 4,480,074 | 10/1984 | Wang | 525/194 |
| 4,593,063 | 6/1986 | Jones et al. | 524/505 |
| 4,607,074 | 8/1986 | Hazelton et al. | 524/425 |
| 4,639,487 | 1/1987 | Hazelton et al. | 524/425 |
| 4,894,408 | 1/1990 | Hazelton et al. | 524/425 |

Primary Examiner—Carman J. Seccuro
Attorney, Agent, or Firm—Gordon B. Seward

[57] ABSTRACT

A dynamically vulcanized composition is provided which comprises a polyolefin resin, an elastomer, and an ethylene copolymer resin such as a copolymer of ethylene and vinyl acetate or an alkyl acrylate. A process for producing the dynamically vulcanized composition is also provided, which process includes the addition of the ethylene copolymer resin after the dynamic vulcanization step. The resulting composition comprises the ethylene copolymer resin predominantly in the polyolefin resin phase. The compositions have improved surface appearance and softness.

26 Claims, No Drawings

ETHYLENE COPOLYMER - MODIFIED DYNAMICALLY VULCANIZED ALLOYS

BACKGROUND OF THE INVENTION

1. Field of the Invention

This invention relates to an improved dynamically vulcanized alloy ("DVA") which comprises a polyolefin thermoplastic resin, an elastomeric component, and an ethylene copolymer.

2. Description of Information Disclosures

Polymer blends which have a combination of both elastic and thermoplastic properties are of significant commercial interest. Such thermoplastic elastomeric compositions are generally obtained by blending an elastomeric polymer with a thermoplastic resin in a way such that the elastomer is intimately and uniformly dispersed as a discrete or co-continuous phase within a continuous or co-continuous phase of the thermoplastic polymer. These polymer blends have been given the generic designation of Thermoplastic Olefins ("TPO"). They exhibit some of the properties of a cured elastomer as well as the reprocessability of a thermoplastic resin. The elastomeric characteristics are enhanced if one component of the blend is a vulcanizable elastomer which is wholly or partially cross-linked.

The earliest work in the curing of a TPO composition was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The resulting blend is a micro-gel dispersion of cured elastomer in an uncured matrix of resinous thermoplastic polymer.

Gessler's U.S. Pat. No. 3,037,954 discloses compositions comprising polypropylene and a rubber such as, for example, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. Nos. 3,758,643 and 3,806,558 disclose TPO type polymer blends comprising an olefin thermoplastic resin and olefin copolymer rubber wherein the rubber is dynamically cured to a partial cure state utilizing a curative such as a peroxide.

Since these early beginnings, numerous developments have taken place in the art of dynamically vulcanized alloys. These developments were generally directed towards the improvement and customizing of DVAs for specific uses. In particular, attention has focused upon the need for a soft, low Shore A hardness dynamically vulcanized alloy (DVA) having good flow properties and surface appearance while maintaining tensile strength, flexibility and elasticity. While an increase in elastomer content generally leads to a softer DVA, it also has a deleterious effect upon surface appearance. Generally when polyethylene or polypropylene is the thermoplastic resin in the blend, a high rubber content in the blend causes degradation of surface appearance. The proportion of rubber at which degradation of surface appearance occurs depends on the polymers used and the presence or absence of other compounding ingredients such as plasticizers and fillers.

U.S. Pat. No. 4,104,210 discloses dynamically vulcanized TPO blends which comprise about 25 to 45 parts of a polyolefin resin and from about 55 to 75 parts of a diene rubber which is a homopolymer or copolymer of a diolefin. U.S. Pat. No. 4,130,534 discloses dynamically vulcanized TPO blends which comprise up to 60 weight percent of a crystalline polyolefin resin and 40 weight percent or more of a butyl rubber. The butyl rubbers utilized include butyl rubber, and chlorinated or brominated butyl rubber.

TPO systems wherein the rubber is fully cured have the disadvantage that, as a result of poor flow characteristics, injection molded components made from such TPO's exhibit "flow line" imperfections. As a consequence, special mold designs are required to minimize the problem, especially for large parts. Uses are further limited because of the high Shore A hardness of such compositions.

U.S. Pat. No. 3,081,279 discloses compositions wherein a rubber, such as butyl rubber, is combined with a sulfochlorinated polyolefin resin and N-methyl-N-nitroso-P-nitroso-aniline and cured in a mold.

U.S. Pat. No. 2,369,471 discloses blends of ethylene polymers with various hydrocarbon rubbers and halogenated rubbers. The compositions are either uncured or compression molded vulcanizates.

U.S. Pat. No. 3,326,833 discloses compositions of a copolymer of ethylene with an alkyl ester of an alpha-beta-monoethylenically unsaturated monocarboxylic acid, e.g., ethylene-ethylacrylate copolymer, and a halogenated olefin polymer. The rubber can be halogenated butyl rubber or chlorinated polyethylene. The compositions when uncured are thermoplastic and when peroxide cross-linked form insoluble non-thermoplastic resins.

U.S. Pat. No. 4,639,487 discloses a TPO blend which utilizes as the thermoplastic continuous phase an ethylene vinyl ester or ethylene-alkylacrylate copolymer with a rubber component which may be a butyl rubber, halogenated butyl rubber, ethylene-propylene-diene rubber (EPDM), polyisoprene, polychloroprene, styrene-butadiene rubber, nitrile rubber, chlorosulfonated polyethylene, etc., wherein the rubber component is dynamically vulcanized to disperse the rubber as fully cured fine particles of a "micro-gel" within the thermoplastic matrix. Such TPO compositions possess exceptional resiliency, high coefficient of friction surfaces and low compression set. Although the TPO blends of the '487 patent have improved properties when such blends contain more than about 20 weight percent vinyl ester they tend to become cured or thermoset upon prolonged exposure to injection processing temperatures. Further, such compounds lack resistance to compression set at temperatures of the order of 100° C. due to the low softening point of the ethylene copolymer resins.

U.S. Pat. No. 4,210,579 discloses a TPO blend including partially crystalline ethylene-propylene copolymer, crystalline polypropylene and 5–30 weight percent ethylene vinyl acetate (EVA) copolymer. No vulcanizing or crosslinking agents are used and all components are mixed together in a batchwise mode under heat and shear stress.

U.S. Pat. No. 4,607,074 discloses TPO compositions including at least two types of rubber and a thermoplastic resin, which may be EVA copolymer. At least one of the rubbers is dynamically vulcanized to a fully vulcanized state by a curing agent which does not vulcanize the other rubber.

U.S. Pat. No. 4,593,063 discloses TPO blends containing up to 35 weight percent of elastomer while maintaining high gloss surface appearance.

U.S. Pat. No. 4,894,408 discloses thermoplastic compositions comprising an ethylene copolymer resin and a dynamically vulcanized fully cured EPDM rubber. The ethylene copolymer resin may be a copolymer of ethylene with vinyl acetate, copolymers of ethylene with alpha, beta monoethylenically unsaturated monocarboxylic acids and copolymers of ethylene with alkyl esters of said acids.

Attempts to produce a softer, lower durometer TPO blend product having good surface appearance and flow properties have concentrated upon increasing the amount of rubber in the blend. While increasing rubber content generally leads to a softer product, if the rubber is fully cured, then the surface appearance, the flow properties and the softness of the product are adversely affected.

It has now been found that the addition of certain copolymers of ethylene to the thermoplastic composition after the dynamic vulcanization of the specified elastomers and a polyolefin-olefin resin improves the surface appearance of softer thermoplastics.

SUMMARY OF THE INVENTION

In accordance with the invention, there is provided:

(a) a cured elastomer selected from the group consisting of a copolymer of a $C_4$ to $C_7$ isomonoolefin and a $C_4$ to $C_{14}$ multiolefin, a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, ethylene-propylene-diene rubber, polyisoprene, polychloroprene, styrene-butadiene rubber, nitrile rubber, chlorosulfonated polyethylene, and mixtures thereof;

(b) a thermoplastic polyolefin resin other than (c);

(c) an ethylene copolymer resin selected from the group consisting of a copolymer of ethylene and vinyl acetate, a copolymer of ethylene and an alkyl ester of an alpha, beta monoethylenically unsaturated monocarboxylic acid, a copolymer of ethylene and an alpha, beta monoethylenically unsaturated monocarboxylic acid and mixtures thereof, at least a major portion of said ethylene copolymer resin being present in said thermoplastic polyolefin resin, said ethylene copolymer resin having been added to the dynamically vulcanized mixture of said elastomer and said polyolefin resin after said elastomer had been sufficiently cured to prevent penetration of a major portion of said ethylene copolymer resin into said elastomer.

DETAILED DESCRIPTION OF THE INVENTION

This invention relates to dynamically vulcanized thermoplastic alloy compositions, herein also referred to as DVAs, which generally comprise a thermoplastic phase and an elastomeric phase.

The general process for producing dynamically vulcanized thermoplastic compositions is well known in the art. The resin, at least one elastomer, fillers, additives, etc., and curing agent are subjected to dynamic vulcanization or the resin, elastomer, filler and additives are premixed, and subsequently subjected to dynamic vulcanization in the presence of a curing agent. The latter process generally includes the steps of: preparing an initial mix of resin, at least one elastomer, fillers, stabilizers, plasticizers, etc.; bringing the initial mix to flux and mixing to the desired level of dispersion; adding curatives for the elastomer; increasing the temperature of the mix to the range necessary for dynamic vulcanization to occur; completing the dynamic vulcanization while continuing to mix at high shear rates; and finally removing the blend from the vulcanization zone maintained at vulcanization temperature, cooling and then pelletizing the DVA product. In the conventional process, the fillers and additives are generally added prior to the addition of curing agents for vulcanization of the elastomer, that is, prior to the dynamic vulcanization step; however, all or a portion of the fillers and additives may be added after the dynamic vulcanization step.

As used herein, the term "dynamic vulcanization" means a vulcanization process for a rubber-containing TPO composition wherein the rubber is vulcanized under conditions of high shear in the presence of the polyolefin resin, as a result of which, the rubber is simultaneously cross-linked and dispersed as fine particles of a "micro-gel" within the thermoplastic resin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin-screw extruders. The unique characteristic of dynamically cured compositions is that, notwithstanding the fact that the rubber component may be fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) is used herein to denote a composition comprising at least one thermoplastic resin and at least one rubber wherein at least one rubber has been dynamically vulcanized to at least a partially cured state. The DVA compositions are prepared by blending together the thermoplastic resin and rubber with curatives and fillers under conditions of dynamic vulcanization.

The term "thermoplastic polyolefin resin", as used herein, denotes any polyolefin resin which exhibits thermoplastic properties excluding ethylene copolymer resins as defined herein.

The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), very low density polyethylene (VLPE), linear low density polyethylene (LLDPE) and polybutylene (PB). However, these other polyolefin resins can be incorporated into the DVA compositions of this invention along with the polypropylene ("PP") or high density polyethylene ("HDPE"). As used herein the term "polypropylene" includes homopolymers of propylene as well as reactor copolymers of polypropylene (PPRC) which can contain about 1 to about 20 weight percent ethylene or an alpha olefin comonomer of 4 to 16 carbon atoms. The polypropylene can be highly crystalline isotactic or syndiotactic polypropylene. The PPRC can be either a random or block copolymer. The density of the PP or PPRC can be from about 0.88 to about 0.92 g/cc; generally, from about 0.89 to about 0.91 g/cc.

High density polyethylene (HDPE), useful as the polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Polyolefin resins which can, optionally, be included in the compositions of this invention include polybutylene, LDPE, LLDPE, VLPE, a plastomeric copolymer of ethylene and 1-alkene, and mixtures thereof.

The term "low density polyethylene" or "LDPE" as used herein means both low and medium density polyethylene having densities of about 0.910 to about 0.940 g/cc. The terms include linear polyethylene as well as copolymers of ethylene which are thermoplastic resins.

The term "very low density polyethylene" or "VLDPE" is used herein to mean polyethylene having a density below about 0.910 g/cc and includes linear polyethylene as well as copolymers of ethylene which are thermoplastic resins.

Linear low density polyethylene (LLDPE) is a class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The term "polybutylene" is used herein to denote thermoplastic resins of both poly(1- butene) homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene-butene-1 copolymers are available with melt indices that range from about 0.3 to about 20 g/10 min.

The term "plastomeric copolymer of ethylene and 1-alkene" includes plastomeric copolymers of ethylene with 1-hexene or with 1-butene, respectively, wherein the hexene or butene content of the respective copolymers ranges from about 1 to about 50, preferably from about 10 to about 45, and most preferably from about 15 to about 40 weight percent. The ethylene-hexene or ethylene-butene copolymers suitable for use in the practice of this invention have a melt index (MI) measured by ASTM Standard D1238 Condition E ranging from about 0.3 to about 50, preferably from about 0.5 to about 10. The degree of crystallinity measured as a heat of fusion by DSC of the ethylene-hexene or ethylene-butene copolymer may range from about 5 to about 85 J/g. The preferred ethylene-hexene or ethylene-butene copolymers have a density ranging from about 0.870 to about 0.900.

The curable, or vulcanizable, rubbers which can be used in the practice of this invention include both synthetic and natural rubbers; at least one of the rubbers utilized must be vulcanizable. Illustrative, non-limiting examples of rubbers suitable for use in the practice of this invention include butyl rubber, halogenated butyl rubber, a copolymer of a $C_4$ to $C_7$ isomonoolefin and a para-alkylstyrene, a halogenated copolymer of a $C_4$ to $C_7$ isomonoolefin and a para-alkylstyrene, ethylene-propylene copolymer rubber (EPM), ethylene-propylene-diene rubber (EPDM), polyisoprene, polychloroprene, styrene-butadiene rubber, nitrile rubbers, chlorosulfonated polyethylene, etc. While polyisobutylene (PIB) is not a true rubber because it cannot be vulcanized, it can be utilized in the practice of this invention in conjunction with a vulcanizable rubber provided that the PIB has a viscosity average molecular weight of about 40,000 to about one million.

The term "rubber" as used herein means any natural or synthetic polymer which can be vulcanized or cured so as to exhibit elastomeric properties. The term "elastomer" is used interchangeably with the term rubber.

The terms "EPM" and "EPDM" are used in the sense of their ASTM designations. EPM is an ethylene-propylene copolymer rubber which can be cross-linked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tetrahydroindene; methyltetrahydroindene; dicyclopentadiene; 5-isopropylidene-2-norbornene; 5-vinyl- norbornene; etc.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20-50 weight percent acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book,* 1980 Edition, Materials and Compounding Ingredients for Rubber, pages 386–406.

Suitable halogenated copolymers of a $C_4$ to $C_7$ isomonoolefin and a para-alkylstyrene include copolymers comprising para-alkylstyrene moieties which may be represented by the formula:

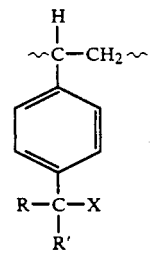

wherein R and $R^1$ are independently selected from the group consisting of hydrogen, alkyl groups having about 1 to 5 carbon atoms, primary and secondary haloalkyl groups having about 1 to 5 carbon atoms, and X is selected from the group consisting of bromine, chlorine and mixtures thereof, such as those disclosed in European Patent Application 89305395.9 filed May 26, 1989(publication No. 0344021 published Nov. 29, 1989). Preferably the alkylstyrene copolymer is a halogenated copolymer of isobutylene and para-methylstyrene, more preferably, the brominated copolymer of isobutylene and para-methylstyrene.

Butyl rubber is a copolymer of an isoolefin and a conjugated multiolefin. The useful rubber copolymers comprise a major portion of isoolefin and a minor amount, preferably not more than 30 wt %, of a conjugated multiolefin. The preferred rubber copolymers comprise about 85-99.5 weight percent (preferably 95-99.5 wt %) of a $C_4$ to $C_7$ isoolefin, such as isobutylene, and about 15-0.5 weight percent (preferably 5-0.5 wt %) of a multiolefin of about 4 to 14 carbon atoms. These copolymers are referred to in the literature as "butyl rubber." The term "butyl rubber" as used herein includes the aforementioned copolymers of an isoolefin having 4 to 7 carbon atoms and about 0.5 to 20 weight percent of a conjugated multiolefin of about 4 to 14 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

Butyl rubber as above described may be halogenated with from about 0.1 to about 10, preferably, about 0.5 to about 3.0 weight percent chlorine or bromine to make a suitable halobutyl rubber. The chlorinated form of butyl rubber is commonly known as "chlorobutyl rubber" and the brominated form as "bromobutyl rubber."

In the practice of this invention, a thermoplastic polyolefin resin other than an ethylene copolymer resin (i.e., other than component C) is mixed with a rubber at a temperature sufficient to soften the resin or, more commonly, at a temperature above its melting point where the resin is crystalline at room temperature. After the resin and rubber are intimately mixed, the curative is added. Heating and masticating with shearing at vulcanization temperatures are generally adequate to complete vulcanization in about 0.5 to about 10 minutes. The vulcanization time can be reduced by elevating the temperature of vulcanization. A suitable range of vulcanization temperatures is from about the peak melting point of the resin (about 130° C. for HDPE and about 165° C. for PP) to about 250° C.; more typically, the temperature range is from about 160° C. to about 225° C. Preferably the vulcanization is carried out at a temperature ranging from about 170° C. to about 200° 6C.

In accordance with the present invention, an ethylene copolymer resin is added to the mixture of polyolefin resin and elastomer after the mixture has been subjected to dynamic vulcanization under conditions which cure the elastomer comprised in the mixture sufficiently to prevent penetration of at least a major portion, preferably to prevent penetration of at least 90 weight percent, of the ethylene copolymer into the elastomer phase. By "major portion" is intended herein more than 50 weight percent. Therefore, the major portion of the ethylene copolymer resin will be present in the thermoplastic polyolefin resin phase. Preferably, the ethylene copolymer resin is added to the mixture of thermoplastic polyolefin resin and elastomer after the mixture has been subjected to dynamic vulcanization under conditions such that the elastomer comprised in the mixture is fully cured to prevent penetration of substantially all of the ethylene copolymer resin into the elastomer phase and thereby, produce a DVA in which the cured elastomer is substantally free of said ethylene copolymer resin. Alternatively, when the ethylene copolymer resin is added to a partially vulcanized elastomer-containing mixture, the resulting mixture may be subjected to additional dynamic vulcanization to produce a composition comprising a fully cured elastomer phase. Preferably, the ethylene copolymer resin is added to the mixture of polyolefin resin and elastomer after the elastomer has been fully vulcanized. The term "ethylene copolymer resin" is used herein to denote copolymers of ethylene and vinyl acetate, copolymers of ethylene and an alpha, beta monoethylenically unsaturated monocarboxylic acid, and copolymers of ethylene and an alkyl ester of an alpha, beta monoethylenically unsaturated carboxylic acid. Suitable ethylene copolymer resins include copolymers of ethylene and vinyl acetate or alkyl acrylates, for example, methyl acrylate, ethyl acrylate, butyl acrylate and mixtures thereof. These ethylene copolymer resins may comprise from about 35 to about 98 weight percent ethylene and typically comprise from about 40 to 90 weight percent ethylene, preferably from about 45 to about 85 weight percent ethylene, more preferably from about 45 to about 80 weight percent ethylene. The preferred ethylene copolymer resin for the practice of the present invention is a copolymer of ethylene and vinyl acetate, herein designated "EVA". The ethylene-copolymer resins suitable for use in the practice of this invention have a melt index of about 0.5 to about 800 (ASTM D 1238 Condition E).

The ethylenic copolymer resin may be added to the composition of the present invention in an amount ranging from about 2 to 20, preferably from about 6 to 15 weight percent based on the sum of the weight of the polyolefin resin, the elastomer and the ethylene copolymer resin.

In addition to its polymer component, the DVA composition of this invention can include reinforcing and non-reinforcing fillers, antioxidants, stabilizers, rubber processing oils, lubricants (e.g., oleamide), antiblocking agents, antistatic agents, waxes, coupling agents for the fillers, foaming agents, pigments, fire retardants, titanium dioxide, talc and other processing aids known in the rubber compounding art. The pigments and fillers may comprise up to 50 weight percent of the total DVA composition based on polymer component plus additives; preferably pigments and fillers comprise above about 0 to about 30 weight percent of the total composition.

Suitable fillers include calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil which should be utilized with a particular rubber. The quantity of rubber process oil utilized is based on the total rubber content, both cured and uncured, and can be defined as the ratio, by weight, of process oil to the total rubber in the DVA. This ratio may range from about above 0 to about 1.5/1, preferably about 0.2/1 to about 1.0/1; more preferably about 0.3/1 to about 0.8/1. Larger amounts of process oil can be used, the deficit being reduced physical strength of the composition. Oils other than petroleum based oils, such as oils derived from coal tar and pine tar, can also be utilized. In addition to the petroleum derived rubber process oils, organic esters and other synthetic plasticizers may be used.

Antioxidants can be utilized in the composition of this invention—the particular antioxidant utilized will depend on the rubbers utilized and more than one type may be required. Their proper selection is well within the ordinary skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating to shield the part from oxygen, ozone, etc.

The chemical protectors generally fall into three chemical groups; secondary amines, phenolics and phosphites. Examples of types of antioxidants useful in the practice of this invention are hindered phenols, amino phenols, hydroquinones, alkyldiamines, amine condensation products, etc. Nonlimiting examples of these and other types of antioxidants are styrenated phenol; 2,2'-methylene-bis(4-methyl-6-1, butylphenol); 2,6'-di-t-butylo-dimethylamino-p-cresol; hydroquinone monobenzyl ether; octylated diphenyl amine; phenyl-beta-nathphylamine; N,N'-diphenylethylene diamine; aldol-alpha-napthylamine; N,N'-diphenyl-p-phenylene diamine; etc. The physical antioxidants include mixed petroleum waxes and microcrystalline waxes. All or a portion of the fillers and/or additives can be added before the dynamic vulcanization step or after the dynamic vulcanization step.

Any conventional cure system for the rubber to be dynamically vulcanized can be used except that peroxide cures are specifically excluded from the practice of this invention when the thermoplastic resins chosen are such that peroxide would cause these thermoplastic resins themselves to crosslink. For example, when ethylene-hexene polymer is the thermoplastic resin, it would itself vulcanize, thereby resulting in a fully cured non-thermoplastic composition. Otherwise, any particular curatives known in the art for the vulcanization of rubbers are suitable. The cures include both sulfur as well as non-sulfur cures. For example, halogenated butyl rubber can be cured using zinc oxide. Accelerators such as dithiocarbamates or thiurams and thioureas may be included in these zinc oxide cures. Zinc oxide free cures of halogenated butyl rubber known to the art can also be utilized. For example, such vulcanizing systems comprise litharge, 2-mercaptoimidazoline and diphenyl guanidine.

Resin cures can be used for both butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

While phenolic resin cures are suitable cures, they impart a yellowish or orangish tinge to the rubber part. For halogenated butyl rubber, a preferred cure is one based on Zno and/or MgO. Such cures permit the use of pigments such as $TiO_2$ to give bright white compositions. In this system, the MgO acts not as an accelerator but as an acid acceptor to stabilize the rubber from dehydrohalogenation.

While any combination of rubbers may be utilized, the preferred rubbers are halogenated rubbers which can be ZnO cured; e.g., halogenated copolymers of a $C_4$ to $C_7$ isomonoolefin and a $C_4$ to $C_{14}$ multiolefin and halogenated copolymers of a $C_4$ to $C_7$ isomonoolefin and a para-alkylstyrene. These rubbers when ZnO cured result in products which have a low odor and have broad FDA compliance in uses such as pharmaceutical enclosures, I.V. solution bag port caps, stoppers, syringes, jar seals, food storage bins, etc.

In a preferred embodiment, the rubber to be vulcanized is a halogenated copolymer of isobutylene and isoprene or a halogenated copolymer of isobutylene and para-methylstyrene, or mixtures thereof. Such halogenated butyl rubbers are preferably vulcanized with zinc oxide cures.

Sulfur-containing accelerators can be utilized with the zinc oxide. These accelerators will generally not vulcanize sulfur curable rubbers such as EPDM when used at the low levels necessary to cure a halogenated butyl rubber.

Illustrative of accelerators which can be used in conjunction with ZnO for curing halobutyl rubber are 2,6-di-tert-butyl-para-cresol; N,N'-diethylthiourea; di-ortho-tolylguanidine; 2-mercapto- benzothiazole; benzothiazole disulfide; N-phenyl- beta-naphthylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises MgO, ZnO and zinc diethyldithiocarbamate since this system results in a vulcanized rubber with low compression set.

The term "fully vulcanized" relative to the dynamically vulcanized rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component of the blends to the extent that the composition contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component, the better are the properties and still more preferable are compositions comprising essentially no extractable rubber from the cured rubber phase (less than 0.5 wt %). Gel content, reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that the large proportion of the resin can be removed from the composition by high temperature solvent extraction, for example, by boiling decalin extraction.

The cross-link density of the rubber is determined by equilibrium solvent swelling using the Flory-Rehner equation, *J. Rubber Chem. and Tech.* 30, p. 929. The appropriate Huggins solubility parameters for rubber-solvent pairs used in the calculation were obtained from the review article by Sheehan and Bisio, *J. Rubber Chem. Tech.*, 39, 149. If the extracted gel content of the vulcanized rubber is low, it is necessary to use the correction of Bueche wherein the term "v" is multiplied by the gel fraction (% gel/100). The cross- ink density is half the effective network chain density "v" determined in the absence of resin. The cross-link density of the vulcanized blends should therefore be understood to refer to the value determined on the same rubber as in the blend in the manner described. Still more preferred compositions meet both of the aforedescribed measures of state of cure, namely, by estimation of cross-link density and percent of rubber extractable.

The dynamically vulcanized composition of the present invention may comprise from about 10 to about 50 weight percent, preferably from about 15 to 30 weight percent of said thermoplastic polyolefin resin, from about 25 to 75, preferably at least about 50, more preferably, at least about 55, most preferably, at least about 60 weight percent of said elastomer, and from about 2 to 20, preferably from about 6 to 15 weight percent of said ethylene copolymer component, based on the sum of the weight of said thermoplastic polyolefin resin plus said elastomer plus said ethylene copolymer component.

The following examples are presented to illustrate the invention. All parts are parts by weight unless otherwise specified.

EXAMPLE 1

Comparative and inventive compositions as described in Table I were mixed in a three pound Banbury mixer using a 7 to 8.5 minute cycle during which time the elastomer phase was dynamically vulcanized; and sheeted out on a cool mill and ground. The original dynamic vulcanizate was molded and tested in this condition. The control blend composition was returned to the Banbury and mixed for an additional three minutes. The invention blend, after the addition of 5 weight percent ethylene vinyl acetate (EVA), was mixed for a like period. After this second mixing step, the control and invention blends were sheeted out on a cool mill and then ground for feed to a 15-ton Boy injection molding machine which injection molded the compositions into plaques from which dumbbells and compression set specimens were die cut. The properties measured for each are shown in Table I.

EXAMPLE 2

Blends were prepared in a three pound Banbury mixer as described in Table II, wherein the timing of the EVA copolymer addition was varied. In one control, no EVA was added, in another, EVA was added along with all the other blend components. In the invention blend, EVA was added only after complete dynamic vulcanization. Dumbbells were prepared as described in Example 1 and the results of tests on these dumbbells are shown in Table II.

EXAMPLE 3

Blends were prepared without copolymer (control); with copolymer added batchwise with all other blend components; and with copolymer added after complete dynamic vulcanization. The compositions and test results performed on test specimens molded and die cut from these blends are shown in Table III.

The results of Table I show that the addition of EVA to the TPO blend after complete dynamic vulcanization improves surface appearance and flow properties over both the original vulcanizate and the blend mixed for an additional three minutes while maintaining physical properties and compression set resistance.

The results of Table II show that the copolymer should be added after complete dynamic vulcanization to obtain the enhancement in physical properties. When EVA was added after cure, both flow and appearance improved. Relative to the control without EVA, measured physical properties improved.

The results of Table III show the benefits of adding the copolymer, EVA or EMA, after complete dynamic vulcanization. Relative to the control without copolymers added, the invention compositions show improvement in surface and flow while softness and physical properties are maintained or improved.

The raw materials used to prepare the compositions in the above examples and the tests are described in Table IV.

TABLE I

| | ORIGINAL DYNAMIC VULCANIZATE | CONTROL - MELT MIXED ADDITIONAL 3 MINUTES | INVENTION - MELT MIXED 3 MINUTES |
|---|---|---|---|
| Added 1st Stage of Mix: | | | |
| Chlorobutyl 1066 (rubber) | 48.5 | | |
| PD 7032 PP[1] (polymer) | 13.8 | | |
| SRF Black N774 | 1.4 | | |
| Maglite D MgO | 0.2 | | |
| Flexon 766 Oil[2] | 28.8 | | |
| Irganox 3114 | 0.5 | | |
| Ultranox 626 | 0.8 | | |
| Curatives: | | | |
| Protox 169 ZnO | 3.0 | 3.0 | |
| SP 1055 Resin | 3.0 | 3.0 | |
| Second Pass Mix: | | | |
| EY 904 25 VAE Copolymer[3] | — | — | 5.0 |
| Original Dynamic Vulcanizate | — | 100 | 95.0 |
| MOLDING PROPERTIES: | | | |
| Spiral Flow, cm | 13.5 | 14.5 | 15 |
| Appearance of Injection Molded Parts | Rough, Flow Marks | Rough, Flow Marks | Smooth |
| PHYSICAL PROPERTIES: INJECTION MOLDED/DIE CUT | | | |
| Hardness, Shore A (5 sec) | 58 | 55 | 55 |
| 100% Modulus, psi | 340 | 270 | 300 |
| Tensile Strength, psi | 550 | 460 | 470 |
| Elongation, % | 190 | 240 | 210 |
| Compression Set B, 22 Hr. @ 100° C. | 35% | 43% | 36% |
| Rubber/(rubber + polymer) | 0.778 | 0.778 | 0.718 |

[1] Thermoplastic impact polypropylene 7% $C_2$, 3 to 4 MFR Condition "L"
[2] Part of oil held out until after cure
[3] VAE Resin; 52% VA, 3 MI Condition "E"

TABLE II

| | CONTROL NO EVA | CONTROL - EVA ADDED WITH OTHER POLYMERS | INVENTION - EVA ADDED AFTER CURE |
|---|---|---|---|
| Added 1st Stage of Mix: | | | |
| Chlorobuty 1066 (rubber) | 48.0 | 45.5 | 45.5 |
| PD 7032 PP (polymer) | 14.0 | 13.2 | 13.2 |
| EY 904-25 VAE (copolymer) | — | 5.0 | — |
| SRF Black N774 | 1.4 | 1.4 | 1.4 |
| Maglite D | 0.2 | 0.2 | 0.2 |
| Flexon 766 Oil | 19.1 | 19.1 | 19.1 |
| Irganox 3114 | 0.5 | 0.5 | 0.5 |
| Ultranox 626 | 0.8 | 0.8 | 0.8 |
| Curatives: | | | |
| SP 1055 Resin | 3.0 | 2.9 | 2.9 |
| Protox 169 ZnO | 3.0 | 2.9 | 2.9 |
| Added After Completion Of Cure | | | |
| Flexon 766 Oil | 10.0 | 8.5 | 8.5 |
| EY 904-25 VAE (Copolymer) | — | — | 5.0 |
| MOLDING PROPERTIES: | | | |
| Spiral Flow, cm | 7.5 | 7.5 | 9.0 |
| Appearance of Injection Molded Parts | Unsatisfactory, Grainy, Flow Marks | Unsatisfactory, Grainy, Flow Marks | Improved- Flow Marks and Graininess Reduced |
| PHYSICAL PROPERTIES: INJECTION MOLDED/DIE CUT | | | |
| Hardness, Shore A (5 sec) | 62 | 60 | 64 |
| 100% Modulus, psi | 420 | 390 | 390 |
| Tensile Strength, psi | 580 | 500 | 670 |
| Elongation, % | 164 | 165 | 220 |
| Compression Set B, 22 Hr. @ 100° C. | 31 | 36 | 34 |
| Rubber/(rubber + polymer) | 0.774 | 0.714 | 0.714 |

TABLE III

|  | CONTROL - NO EVA OR EMA | CONTROL - EVA ADDED WITH OTHER POLYMERS | INVENTION - EVA ADDED AFTER CURE | CONTROL - EMA ADDED WITH OTHER POLYMERS | INVENTION - EMA ADDED AFTER CURE |
|---|---|---|---|---|---|
| Added 1st Stage of Mix: |  |  |  |  |  |
| Bromobutyl 2244 (rubber) | 47.0 | 45.0 | 45.0 | 45.0 | 45.0 |
| PD 7031 PP[1] (polymer) | 14.1 | 14.1 | 14.1 | 14.1 | 14.1 |
| Whitetex Clay | 5.6 | 3.6 | 3.6 | 3.6 | 3.6 |
| SRF Black N774 | 2.0 | 2.0 | 2.0 | 2.0 | 2.0 |
| Maglite D | 0.5 | 0.5 | 0.5 | 0.5 | 0.5 |
| EY 904-25 VAE (copolymer) | — | 5.0 | — | — | — |
| XS 4.04 EMA[2] (copolymer) | — | — | — | 5.0 | — |
| Arcoprime 350 Oil | 18.2 | 17.2 | 17.2 | 17.2 | 17.2 |
| Curatives: |  |  |  |  |  |
| Echo S | 1.4 | 1.4 | 1.4 | 1.4 | 1.4 |
| Vanax 808 | 1.2 | 1.2 | 1.2 | 1.2 | 1.2 |
| Added After Completion of Cure: |  |  |  |  |  |
| Arcoprime 350 Oil | 10.0 | 10.0 | 10.0 | 10.0 | 10.0 |
| EY 904-25 VAE (copolymer) | — | — | 5.0 | — | — |
| XS 4.04 EMA (copolymer) | — | — | — | — | 5.0 |
| Molding Properties: |  |  |  |  |  |
| Spiral Flow, cm | 16 | 17 | 18 | 15 | 17 |
| Appearance of Injection Molded Parts | Poor-Rough Flow Marks | Fair-Some Roughness Flow Marks | Good-Minimal Flow Marks | Poor-Rough Flow Marks | Good-Minimal Flow Marks |
| Physical Properties Injection Molded, Die Cut |  |  |  |  |  |
| Hardness, Shore A (5 sec) | 54 | 50 | 51 | 57 | 54 |
| 100% Modulus, psi | 260 | 270 | 270 | 290 | 250 |
| Tensile Strength, psi | 460 | 570 | 640 | 460 | 500 |
| Elongation, % | 220 | 240 | 280 | 190 | 240 |
| Rubber/(rubber + polymer) | 0.769 | 0.702 | 0.702 | 0.702 | 0.702 |

[1]Thermoplastic impact grade polypropylene polymer, 7% Ethylene, 0.6 MFR (Condition L)
[2]20% MA, 100 MI (Condition E)

TABLE IV

| | |
|---|---|
| Arcoprime 350 Oil | Paraffinic white oil, ARCO |
| Bromobutyl 2244 | Brominated isoprene-isobutylene copolymer, 41-51 Mooney Viscosity (1 + 8) 125° C., EXXON CHEMICALS |
| Chlorobutyl 1066 | Chlorinated isoprene-isobutylene copolymer, 51-60 Mooney Viscosity (1 + 8) 100° C., EXXON CHEMICAL AMERICAS |
| Echo S | Thiadiazole curing agent, HERCULES |
| EY 904 25 VAE | Vinyl acetate-ethylene copolymer 52% vinyl acetate, 3.0 MI, Condition E, U.S.I. CHEMICALS |
| Flexon 766 Oil | Naphthenic processing oil, EXXON |
| Irganox 3114 | Tris(3,5-di-tert-butyl-4 hydroxybenzyl) isocyanurate antioxidant, CIBA-GEIGY |
| Maglite D MgO | Magnesium oxide, highly active |
| PD 7032 PP | Medium impact grade polypropylene copolymer resin, 4.0 MFR, Condition L, EXXON CHEMICALS |
| PD 7031 PP | Medium impact grade polypropylene copolymer resin, 0.5 MFR, Condition L, EXXON CHEMICALS |
| Protox 169 Zinc Oxide | French process zinc oxide |
| SRF Black N774 | Carbon black, large particle size, normal structure (various suppliers) |
| SP 1055 Resin | Brominated alkyl phenol resin, SCHENECTADY CHEMICAL |
| Ultranox 626 | Bis (2, 4-di-t-butylphenyl) Pentaerythritol Diphosphite; BORG WARNER CHEMICALS |
| Vanax 808 | Butylaldehyde-aniline condensation product, R. T. VANDERBILT |
| Whitetex Clay | Kaolin clay, FREEPORT KAOLIN CO. |
| XS 4.04 EMA | Ethylene methyl acrylate copolymer resin, 20% methyl acrylate, 100 melt index |

TABLE V

| TEST | TEST METHOD |
|---|---|
| Shore A Hardness, (5 sec) | ASTM D2240 |
| 100% Modulus, psi | ASTM D412 |
| Tensile Strength, psi | ASTM D412 |
| Elongation, % | ASTM D412 |
| Compression Set B, Piled 22 Hrs. @ 100° C., % | ASTM D395 |
| Spiral Flow,[(1)] | See Footnote |
| Melt Index | ASTM D1238 |

[(1)]The spiral flow method is performed by injecting the composition to be tested at a nozzle temperature of 220° C. and a pressure of 800 psi into a spiral mold containing a pathway of semicircular cross section having a diameter of 0.3 cm, and measuring the length of the portion of the pathway filled by the composition.

What is claimed is:

1. A dynamically vulcanized composition comprising:
   (a) a cured elastomer selected from the group consisting of a copolymer of a $C_4$ to $C_7$ isomonoolefin and $C_4$ to $C_{14}$ multiolefin, a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, ethylene-propylene-diene rubber, polyisoprene polychloroprene, styrene-butadiene rubber, nitrile rubber, chlorosulfonated polyethylene, and mixtures thereof;
   (b) a thermoplastic polyolefin resin other than (c);
   (c) an ethylene copolymer resin selected from the group consisting of a copolymer of ethylene and vinyl acetate, a copolymer of ethylene and an alkyl ester of an alpha, beta monoethylenically unsaturated monocarboxylic acid, a copolymer of ethylene and an alpha, beta monoethylenically unsaturated monocarboxylic acid and mixtures thereof, at least a major portion of said ethylene copolymer resin being present in said thermoplastic polyolefin resin, said ethylene copolymer resin having been added to the dynamically vulcanized mixture of said elastomer and said polyolefin resin after said elastomer had been sufficiently cured to prevent penetration of a major portion of said ethylene copolymer resin into said elastomer.

2. The dynamically vulcanized composition of claim 1, wherein said cured elastomer (a) is substantially free of said ethylene copolymer resin (c).

3. The composition of claim 1, wherein said cured elastomer is present in an amount of at least about 50 weight percent based on the sum of the weight of said (a) plus said (b) plus said (c).

4. The composition of claim 1, wherein said ethylene copolymer resin (c) is present in an amount ranging from about 2 to about 20 weight percent, based on the sum of the weight of said (a) plus said (b) plus said (c).

5. The composition of claim 1 wherein said ethylene copolymer resin (c) is ethylene vinyl acetate.

6. The composition of claim 1, wherein said ethylene copolymer is an ethylene alkyl ester copolymer selected from the group consisting of ethylene methyl acrylate, ethylene ethyl acrylate, ethylene butyl acrylate, and mixtures thereof.

7. The composition of claim 1, wherein the ethylene moieties in said ethylene copolymer resin (c) are present in an amount ranging from about 35 to about 98 weight percent, based on said ethylene copolymer resin (c).

8. The composition of claim 1, wherein said elastomer (a) is substantially fully cured.

9. The composition of claim 1, wherein said thermoplastic polyolefin resin has a peak melting point of at least about 100° C.

10. The composition of claim 1, wherein said cured elastomer (a) is present in an amount ranging from about 25 to about 75 weight percent; said thermoplastic polyolefin resin (b) is present in an amount ranging from about 10 to about 50 weight percent; and said ethylene copolymer resin (c) is present in an amount ranging from about 2 to about 20 weight percent, all said percentages being based on the sum of the weight of said (a) plus said (b) plus said (c).

11. The composition of claim 1, wherein said thermoplastic polyolefin resin is selected from the group consisting of polypropylene, high density polyethylene, low density polyethylene, very low density polyethylene, linear low density polyethylene, polybutylene, and mixtures thereof.

12. The composition of claim 1, wherein said cured elastomer is selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof.

13. The composition of claim 1, wherein said cured elastomer is selected from the group consisting of a halogenated copolymer of isobutylene and isoprene, a halogenated copolymer of isobutylene and para-methylstyrene, and mixtures thereof.

14. A process for producing a dynamically vulcanized composition, which comprises the steps of:
(a) dynamically vulcanizing a thermoplastic polyolefin resin other than an ethylene copolymer resin, and an elastomer selected from the group consisting of a copolymer of a $C_4$ to $C_7$ isomonoolefin and a $C_4$ to $C_{14}$ multiolefin, a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, ethylene-propylene-diene rubber, polyisoprene, polychloroprene, styrene-butadiene rubber, nitrile rubber, chlorosulfonated polyethylene, and mixtures thereof, in the presence of a curing agent for said elastomer, at dynamic vulcanization conditions to produce a dynamically vulcanized mixture;
(b) adding an ethylene copolymer resin selected from the group consisting of a copolymer of ethylene and vinyl acetate, a copolymer of ethylene and an alkyl ester of an alpha, beta monoethylenically unsaturated monocarboxylic acid, a copolymer of ethylene and an alpha, beta monoethylenically unsaturated carboxylic acid, and mixtures thereof to said dynamically vulcanized mixture resulting from step (a), said dynamic vulcanization step (a) having been conducted at conditions such as to cure said elastomer sufficiently to produce a dynamically vulcanized composition comprising the major portion of said ethylene copolymer resin in said polyolefin resin.

15. The process of claim 14, wherein the dynamically vulcanized mixture resulting from step (a) comprises an at least partially cured elastomer and wherein said ethylene copolymer resin is added in step (b) to said dynamically vulcanized mixture comprising said at least partially cured elastomer.

16. The process of claim 14, wherein said ethylene copolymer resin is added to a dynamically vulcanized mixture comprising a partially cured elastomer, and wherein after step (b), the resulting mixture is additionally vulcanized for a time sufficient to produce a dynamically vulcanized composition comprising a substantially fully cured elastomer.

17. The process of claim 14, wherein said dynamically vulcanized mixture resulting from step (a) is subjected to dynamic vulcanization for a time sufficient to produce a dynamically vulcanized composition comprising a cured elastomer substantially free of said ethylene copolymer resin.

18. The process of claim 14, wherein prior to said dynamic vulcanization step (a), said thermoplastic resin and said elastomer are mixed to produce a blend, and wherein said curing agent is introduced into said blend.

19. The process of claim 14, wherein said ethylene copolymer resin is ethylene vinyl acetate.

20. The process of claim 14, wherein said ethylene copolymer resin is an ethylene alkyl ester copolymer selected from the group consisting of ethylene methyl acrylate, ethylene ethyl acrylate, ethylene butyl acrylate, and mixtures thereof.

21. The process of claim 14, wherein said dynamic vulcanization conditions include a temperature ranging from about the melting point of said polyolefin resin to about 250° C.

22. The process of claim 14, wherein said thermoplastic polyolefin resin has a peak melting point of at least about 100° C.

23. The process of claim 14, wherein said thermoplastic polyolefin resin is selected from the group consisting of polypropylene, high density polyethylene, linear low density polyethylene, very low density polyethylene, polybutylene, and mixtures thereof.

24. The process of claim 14, wherein said elastomer is selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof.

25. The process of claim 14, wherein said elastomer is selected from the group consisting of a halogenated copolymer of isobutylene and isoprene, a halogenated copolymer of isobutylene and para-methylstyrene, and mixtures thereof.

26. The process of claim 14, wherein said elastomer is present in said composition in an amount of at least about 50 weight percent, based on the sum of the weight of said polyolefin resin plus said elastomer plus said ethylene copolymer resin.

* * * * *